Patented July 18, 1933

1,918,503

UNITED STATES PATENT OFFICE

CHARLES J. STROSACKER AND CLARENCE C. SCHWEGLER, OF MIDLAND, MICHIGAN, ASSIGNORS TO THE DOW CHEMICAL COMPANY, OF MIDLAND, MICHIGAN, A CORPORATION OF MICHIGAN

METHOD OF PREPARING ANTIPYRINE

No Drawing. Application filed September 18, 1931. Serial No. 563,672.

The present invention relates to the preparation of di-methyl-phenyl-pyrazolone, known as antipyrine, and provides an improved procedure whereby a pure, white product is obtained in a novel manner.

Our invention deals with a process for the treatment of antipyrine-hydrobromide formed by methylating phenyl-methyl-pyrazolone with methyl bromide and methyl alcohol wherein antipyrine is prepared therefrom and our improvements include the use of suitable novel solvents and procedures.

To the accomplishment of the foregoing and related ends, the invention, then, consists of the steps hereinafter fully described and particularly pointed out in the claims, the following description setting forth in detail several modes of carrying out the invention, such disclosed modes illustrating, however, but several of the various ways in which the principle of the invention may be used.

By former procedure antipyrine-hydrobromide was poured in the hot liquid state into a caustic soda solution and benzene mixture. The sodium bromide in aqueous solution was separated from the reaction mixture and the antipyrine was crystallized by cooling from the resulting benzene solution thereof. Antipyrine crystals so obtained are colored and impure and must be recrystallized many times from water and finally from alcohol to obtain a satisfactory product.

By our procedure we run the hot liquid hydrobromide into a mixture of aqueous caustic soda and mono-chlorobenzene using about two volumes of chlorobenzene to one volume of 40 per cent caustic soda solution. This proportion provides sufficient water in the reaction mixture to hold in solution the sodium bromide formed. The reaction temperature is maintained at about 65° C. by cooling, at first, and adding heat toward the end of the reaction. An excess of caustic soda is used, about one weight of antipyrine-hydrobromide being added to one weight of chlorobenzene in the mixture.

The water solution of sodium bromide and excess caustic soda is drawn off and separated from the oil layer of the reaction mixture. The oil layer is a chlorobenzene solution of antipyrine. The so derived oil layer is then preferably cooled and to it is added cold water followed by mixing, settling and separation, whereby a portion of the antipyrine is washed out, or extracted as a water solution thereof, leaving the chlorobenzene oil layer containing unextracted antipyrine together with chlorobenzene-soluble impurities. The water washing, or extraction, step is repeated a number of times until all or substantially all of the antipyrine has been extracted from the oil layer. In practice four washes are employed, and a reduced volume of water is used for each succeeding wash, i. e. about four volumes being employed for the first wash and less than one volume for the last of four washes.

The extracting step may be conducted as described, that is, in batches, or the oil and water may be passed through a series of mixing and separating steps in countercurrent to accomplish the extraction in a continuous or semi-continuous manner. The exact procedure in the water extracting steps is immaterial to the principle of our invention.

The wash waters containing the antipyrine are run into a still and evaporated, preferably under reduced pressure such as a vacuum of 25 inches of mercury. The wash waters may be introduced into the still as obtained and evaporated while further washings are being conducted. All the water is evaporated in the still to leave a residue of hot liquid antipyrine which contains, however, water soluble impurities.

Chlorobenzene is run into the still and heat applied to dissolve the still residue of antipyrine therein. The chlorobenzene used may be fresh or recovered, as convenient. The so obtained hot chlorobenzene solution of antipyrine is then filtered hot to separate on the filter the impurities insoluble in the solvent.

The filtrate is then cooled to crystallize out antipyrine which is separated from the mother liquor by draining, wheeling, etc., and constitutes, after drying, a finished product of superior quality which is white and substantially pure.

The mother liquors from the crystallizing step may be worked up in any suitable manner. They may, for instance, be concentrated by evaporation and cooled to obtain a second crop of crystals, such crystals, if not of satisfactory purity, may be dissolved in ice water, filtered, and the solution evaporated to obtain an antipyrine residue which, after solution in chlorobenzene, may be cooled and again crystallized therefrom. Mother liquors may, however, be extracted with large volumes of water to recover antipyrine therefrom in a manner similar to that previously outlined for the oil layer of the reaction mixture.

The chlorobenzene residues may be distilled or otherwise purified to recover chlorobenzene therefrom for reuse in any part of the process, and in general the chlorobenzene may be recycled in the process with suitable purification.

We find chlorobenzene to be a convenient solvent and to possess properties highly advantageous in the production of antipyrine. Its high boiling point substantially avoids loss by evaporation in filtering, centrifuging, handling, etc. contrasting in these properties with benzene and other more volatile solvents heretofore employed, use of which involves considerable evaporation losses. Its specific gravity facilitates separation from the water extraction layer. It may be obtained pure and readily recovered in a pure state for reuse. It has a high flash-point which reduces fire hazard. It dissolves its own weight of antipyrine and dissolves oily impurities, retaining same in an effective manner during the water extraction steps.

Caustic potash, carbonate or bi-carbonate of sodium or potassium, lime, magnesia or other bases which will react may be employed instead of caustic soda, but the latter is preferable when cheaply convenient.

By proceeding in accordance with the steps of our invention as hereinbefore set forth, the manufacture of antipyrine may be conducted with a reduced amount of equipment, in shorter time with less labor, and with conservation of materials.

The product, moreover, is of high purity, white, and meets the requirements of the trade.

Although we prefer to use mono-chlorobenzene as the organic solvent, water extraction is advantageous whatever solvent be used, hence any suitable water immiscible solvent may be employed and the advantages of extracting the antipyrine from the solvent solution thereof with water to leave the solvent-soluble impurities behind, persist with such other solvents.

Other modes of applying the principle of our invention may be employed instead of the ones explained, change being made as regards the method herein disclosed, provided the step or steps stated by any of the following claims or the equivalent of such stated step or steps be employed.

We therefore particularly point out and distinctly claim as our invention:—

1. The method of preparing antipyrine which comprises reacting antipyrine-hydrobromide with an aqueous solution of an alkali in the presence of a solvent immiscible with water while agitating the reaction mixture, separating from the reaction mixture a solution of antipyrine in the solvent, extracting the antipyrine from said solution with water, evaporating the water therefrom to leave a residue of antipyrine, and recrystallizing the antipyrine from monochlorobenzene.

2. The method of preparing antipyrine from antipyrine-hydrobromide by reaction with an alkali, which comprises mixing the hot liquid hydrobromide with a mixture of about one volume of a 40 per cent caustic soda water solution and two volumes of chlorobenzene in the ratio of about one weight of the hydrobromide to one weight of the chlorobenzene while maintaining the temperature of the reaction mixture at about 65° C., settling, and extracting the antipyrine from the resulting oil layer with water.

3. The method of preparing antipyrine from antipyrine-hydrobromide by reaction with an alkali, which comprises mixing the hot liquid hydrobromide with a mixture of about one volume of a 40 per cent caustic soda water solution and two volumes of chlorobenzene in the ratio of about one weight of the hydrobromide to one weight of the chlorobenzene while maintaining the temperature of the reaction mixture at about 65° C., settling, and extracting the antipyrine from the resulting oil layer with water, and evaporating water from the water extract solution of antipyrine, preferably under reduced pressure, to obtain a residue of the latter.

4. The method of preparing antipyrine from antipyrine-hydrobromide by reaction with an alkali, which comprises mixing the hot liquid hydrobromide with a mixture of about one volume of a 40 per cent caustic soda water solution and two volumes of chlorobenzene in the ratio of about one weight of the hydrobromide to one weight of the chlorobenzene while maintaining the temperature of the reaction mixture at about 65° C., settling, and extracting the antipyrine from the resuling oil layer with water, evaporating water from the water extract solution of antipyrine, preferably under reduced pressure, to obtain a residue of the latter, dissolving said residue in chlorobenzene and cooling to obtain crystals of antipyrine.

5. The method of separating antipyrine from a reaction solution thereof in chlorobenzene, which comprises washing the solution with water to extract therefrom antipyrine as a water solution thereof, evaporating the water from such solution to leave a residue of antipyrine, dissolving the residue in hot chlorobenzene, and cooling the solution to crystallize the antipyrine.

6. In a method of preparing antipyrine from antipyrine-hydrobromide by reaction with an alkali, the steps which consist in so reacting in the presence of chlorobenzene as a solvent for antipyrine, and extracting antipyrine from the resulting chlorobenzene solution thereof with water.

7. In a method of preparing antipyrine wherein a solution of antipyrine in a solvent immiscible with water is obtained, the step which consists in extracting the antipyrine from such solution with cold water.

CHARLES J. STROSACKER.
CLARENCE C. SCHWEGLER.